United States Patent Office 2,714,600
Patented Aug. 2, 1955

---

2,714,600

OXIDATION-CHLORINATION OF 3-HYDROXYSTEROIDS

Gunther S. Fonken, Kalamazoo, Robert H. Levin, Kalamazoo Township, Kalamazoo County, and A Vern McIntosh, Jr., Kalamazoo, Mich., assignors to The Upjohn Company, Kalamazoo, Mich., a corporation of Michigan No Drawing. Application July 16, 1952,
Serial No. 299,233

15 Claims. (Cl. 260—397.45)

This invention relates to steroid compounds, and is more particularly concerned with a novel, industrially important process for the conversion of 3-hydroxysteroids to 4-chloro-3-ketosteroids in high yields by the action of an organic hypochlorite, preferably an alkyl hypochlorite, and with the novel steroids thus-produced.

It is an object of the present invention to provide a novel commercially significant process for the concomitant chlorination and oxidation of 3-hydroxysteroids to 4-chloro-3-ketosteroids in high yields. Another object is the provision of certain novel and useful 4-chloro-3-ketosteroids. Other objects of this invention will be apparent to those skilled in the art to which this invention pertains.

4-chloro-3-ketosteroids are valuable precursors to physiologically active steroids. $3\alpha,17\alpha$-dihydroxy-21-acetoxypregnane-11,20-dione, for example, can be concomitantly chlorinated and oxidized to the novel 4-chloro-$17\alpha$-hydroxy-21-acetoxypregnane-3,11,20-trione, which can thereafter be dehydrohalogenated by procedure well-known in the art, to produce cortisone acetate. Moreover, 4-chloro-3-ketosteroids have been found to be very stable compounds and can be kept for long periods of time without noticeable decomposition. Since most physiologically active hormone and hormone-like steroids possess a $\Delta^4$-3-keto group, a process which produces a 3-keto group and a 4-chloro group, concomitantly and without extensive manipulation or the necessity of carefully controlled conditions, is of considerable industrial importance. A further advantage of the process of the present invention resides in the fact that the chlorination is achieved without the use of chlorine gas, the prior art use of which was sufficiently inconvenient and unsatisfactory to reduce interest in the chlorination of steroids to a minimum. Moreover, the process of the present invention is conveniently performed at about room temperature, e. g., between about twenty and about thirty degrees centigrade, usually without external heating or cooling, thus adding to the convenience, simplicity, and economy of the process.

The process of the present invention, besides being a simple, economical, and convenient method of converting a 3-hydroxysteroid to a 4-chloro-3-ketosteroid in one step, is especially advantageous in that yields of desired product are frequently obtained in excess of ninety percent of the theoretical, as illustrated by Example 1. The product thus-obtained is sufficiently pure for most purposes and does not usually require purification. These results are economically very important since the prior art two-step methods of oxidation and chlorination of 3-hydroxy steroids involve isolations and purifications, usually in both steps, with resulting reduction in yields. Other uses and advantages of this industrially significant invention will be apparent to those skilled in the art to which this invention pertains.

Preferred starting compounds of the present invention are 3-hydroxysteroids having the normal configuration at the 5-carbon atom, which are unsubstituted at the 4-position, which are saturated (i. e., carbon to carbon double and triple-bonds are not present), and which do not thave unsubstituted primary or secondary hydroxyl groups other than the 3-hydroxyl group, since these unsaturated linkages and hydroxyl groups, which also usually react with organic hypochlorites, sometimes unduly complicate the reaction. Steroids of the above type, but containing, in addition, an $11\alpha$(or $\beta$)-hydroxyl group, are also included as preferred starting compounds since the $11\alpha$-hydroxyl group usually is unaffected by alkyl hypochlorites, and the $11\beta$-hydroxyl group is smoothly converted to an 11-ketonic oxygen by using two additional molar equivalents of the alkyl hypochlorite. This delineation of preferred starting compounds, however, is not to be construed as limiting the scope of this invention. Other 3-hydroxy steroids which are converted to 4-chloro-3-ketosteroids by the process of this invention are also included as starting materials within the scope of this invention. If additional groups such as, for example, unsaturated linkages or other hydroxyl groups, or other groupings, are present which are reactive with the alkyl hypochlorite under the conditions of the reaction, an additional amount of the organic hypochlorite may be included in the reaction mixture to react with these additional groups. Alternatively these additional reactive groups in the starting compounds may be protected and later regenerated in the product obtained by the process of the present invention, for example, carbon to carbon double-bonds may be protected by adding two bromine atoms and later regenerated by treating with zinc. Additional hydroxyl groups may be protected, for example, by selective ester or ether formation and later regenerated by hydrolysis. In some instances chlorination occurs at a position other than the 4-position, e. g., at the 2-position when a 3-hydroxyallosteroid is employed as starting material.

Preferred starting normal $3\alpha$(or $\beta$)-hydroxysteroids of particular interest are those having the following structural formula:

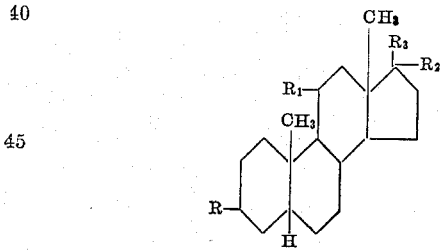

wherein R is $\alpha$-hydroxy or $\beta$-hydroxy; $R_1$ is hydrogen, $\alpha$-hydroxy or an acyloxy ester thereof, such as, for example, formyloxy, acetoxy, benzoyloxy, propionoxy, butyryloxy, valeryloxy, hexanoyloxy, phenylacetoxy, octanoyloxy, or the like, especially lower-alkanoyloxy, or $\beta$-hydroxy, or ketonic oxygen; $R_2$ is hydrogen or hydroxy; and $R_3$ is acetyl, acyloxyacetyl, e. g., acetoxyacetyl, propionoxyacetyl, butyryloxyacetyl, octanoyloxyacetyl, benzoyloxyacetyl, or the like, especially acyloxyacetyl wherein the acyloxy group is a lower-alkanoyloxy group, or haloacetyl, e. g., bromoacetyl, chloroacetyl, or the like.

According to the method of the present invention, a 3-hydroxysteroid is contacted, in the presence of water, with an organic hypochlorite, and preferably with an alkyl hypochlorite.

In carrying out the process of the present invention, a 3-hydroxysteroid is contacted, in the presence of from a trace to about twenty percent of water based upon the total weight of the reaction mixture, with an organic hypochlorite, preferably an alkyl hypochlorite. The reaction is usually conducted in the presence of an organic solvent such as, for example, tertiary-butyl alcohol, tertiary-amyl alcohol, chloroform, ethylene dichloride, or the like, the concept, definition, and use of a solvent being well-known in the art. The employed temperature is usually between about minus ten and about plus fifty degrees centigrade, ordinarily at about room temperature, e. g., between about twenty and about thirty degrees centigrade, for a reaction period of between about ten minutes and about twenty-four hours, the exact time required for complete reaction being in part dependent upon the reaction temperature and the particular hypochlorite and solvent employed, as well as other factors apparent to one skilled in the art.

Although the use of organic hypochlorites generally is within the purview of the present invention, alkyl hypochlorites are usually used. The secondary-alkyl hypochlorites, however, are relatively unstable and for this reason are not the preferred hypochlorites. Since methyl hypochlorite is extremely unstable and even explosive in certain instances, it is preferably not employed in carrying out the process of the present invention. The tertiary-alkyl hypochlorites have been found to be particularly satisfactory organic hypochlorites, being quite stable, and of these, tertiary-butyl hypochlorite has been used with repeated success and is therefore a preferred alkyl hypochlorite. Best yields of the desired 4-chloro-3-ketosteroids appear to be obtained when the alkyl hypochlorite is employed in the molar ratio to starting 3-hydroxysteroid of at least about two to one, preferably from about 2.2 to about 2.5 moles of alkyl hypochlorite to one mole of starting steroid. Large molar excesses of alkyl hypochlorite do not appear to be advantageous and may even be disadvantageous in certain instances. However, if an additional group which reacts with the alkyl hypochlorite is present, the amount of alkyl hypochlorite is increased by the amount required to react with the additional group.

While considerably broader ranges of reaction temperature, e. g., between about minus ten and about plus fifty degrees centigrade, are included within the scope of the present invention, the preferred reaction temperature is at or about room temperature, e. g., between about twenty and about thirty degrees centigrade, as high yields of desired product are obtained at this temperature and external cooling or heating is usually unnecessary. Sometimes, however, a reaction temperature slightly below room temperature will enhance the yield of desired product when the reaction is unduly accompanied by undesirable side reactions. Usually reaction temperatures substantially above room temperature are not preferred. In general the preferred reaction temperature, while usually room temperature, varies somewhat with the starting steroid and the alkyl hypochlorite employed. Temperatures substantially below minus ten and substantially above plus fifty degrees centigrade are operative in certain instances.

Tertiary alkanols have been found to be excellent reaction solvents and tertiary-butyl alcohol, a preferred solvent, has been used with repeated success. Other solvents such as, for example, tertiary-amyl alcohol, chloroform, ethylene dichloride, pentane, hexane, and the like, are also suitable. The choice of reaction solvent depends in part on the solubility of the starting steroid in the solvent.

The presence of water is an important factor in carrying out the process of the present invention. Water is, therefore, always present in the reaction mixture, from 0.5 percent to about twenty percent of the total reaction mixture by weight being the usual operating limits. When only a trace of water is present, the yields of desired product are less than optimum, and when more than twenty percent water, based on the total reaction weight is employed, the reaction is usually sluggish and requires long periods of time for completion of the reaction. Usually about two to about six percent water gives the best yields of product.

It has also been found that the addition of a strong acid such as, for example, hydrochloric, sulfuric, benzenesulfonic, para-toluenesulfonic acid, or the like, and particularly hydrochloric acid, to the reaction mixture enhances the yield of desired product and preferred operating conditions include the addition of from about 0.5 mole to about 1.5 moles of hydrochloric acid per mole of steroid to the reaction mixture. The reaction can be carried out in the presence or absence of light.

Isolation of the desired product of the reaction is conveniently achieved by distilling the volatile components of the reaction mixture at reduced pressure, leaving the steroid product as the distillation residue. Quite frequently, especially when using tertiary-butyl alcohol as reaction solvent, the desired reaction product crystallizes from the reaction mixture in a state of high purity and does not require further purification. Purification of the reaction product can be achieved, however, if desired, by crystallization from a solvent such as, for example, methanol, ethanol, ether, chloroform, methylene dichloride, or the like, or by adsorption and elution on a chromatographic column according to methods well-known in the art.

The progress of the oxidation can conveniently be followed by iodometric titration, according to methods known in the art, of aliquot samples taken from time to time from the reaction mixture. When consumption of alkyl hypochlorite has essentially ceased or when the theoretical amount has been consumed, the reaction is usually complete and further reaction time is unnecessary.

An especially preferred method of carrying out the process of the present invention involves dissolving the selected 3-hydroxysteroid in a solvent, preferably tertiary-butyl alcohol, and contacting the solution with from about 2.2 to about 2.5 molar equivalents of an alkyl hypochlorite, preferably tertiary-butyl hypochlorite, in the presence of from about 0.5 to about 1.5 molar equivalents of dilute hydrochloric acid for from about ten minutes to about twenty-four hours. When the reaction is complete, the solvent may be distilled at about room temperature at reduced pressure and the steroid product obtained as the distillation residue.

The following examples are illustrative of the process and products of the present invention but are not to be construed as limiting.

PREPARATION 1.—3α,17α-DIHYDROXYPREGNANE-11,20-DIONE 20-ETHYLENE GLYCOL KETAL

A mixture of 260 milligrams of 3α,17α-dihydroxypregnane-11, 20-dione [Kritchevsky, Garmaise, and Gallagher, J. Am. Chem. Soc., 74, 483 (1952)], five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water which formed was removed by co-distillation with benzene and was collected in the water trap. The reaction mixture was cooled and poured into a dilute solution of sodium bicarbonate. The benzene layer was separated, washed with water, dried and concentrated to dryness. The residue was chromatographed over forty grams of Florisil magnesium silicate using eighty-milliliter portions of a mixture of ethylene dichloride with successively greater proportions of acetone for elution. The material, which was eluted with ethylene dichloride-acetone (12:1 and 8:1), weighed 141 milligrams after removal of the solvents. Recrystallization from benzene-Skelly Solve B gave fifty milligrams of 3α,17α-dihydroxypregnane-11,20-dione 20-ethylene glycol ketal melting at 144 to 146 degrees centigrade.

Analysis:
  Calculated for C₂₃H₃₆O₅ ------ C, 70.37; H, 9.25
  Found ---------------------- C, 70.65; H, 9.28

PREPARATION 2.—3α,11α,17α-TRIHYDROXYPREGNAN-20-ONE AND 3α,11β,17α-TRIHYDROXYPREGNAN-20-ONE

To a solution of two grams of lithium aluminum hydride in 200 milliliters of anhydrous ether was added dropwise, with stirring, two grams of 3α,17α-dihydroxypregnane-11,20-dione 20-ethylene glycol ketal from Preparation 1 in twenty milliliters of anhydrous benzene. The mixture was then stirred at room temperature for one hour followed by boiling under reflux for an additional hour. With continued stirring the resulting mixture was cooled and treated cautiously with water added dropwise. The resulting solution containing the 3α,11,17α-trihydroxypregnan-20-one 20-ethylene glycol ketals then was admixed with a ten-fold excess of dilute hydrochloric acid and the resulting heterogeneous mixture was stirred vigorously for twenty hours at room temperature. The product was isolated by separating the organic and aqueous layers, extracting the aqueous layer with ether, combining the ether extract with the organic layer, washing the organic solution twice with water, drying the washed solution over anhydrous sodium sulfate, removing the drying agent by filtration, removing the solvents by distillation under reduced pressure, dissolving the resulting residual oil in ethyl acetate, and adding Skelly Solve B to give an opalescent solution. The crystals obtained (Crop A), 540 milligrams, were removed by filtration, and an additional quantity of Skelly Solve B was added to the filtrate. The crystals obtained from the diluted filtrate (Crop B) were separated by filtration weighing 590 milligrams. An additional quantity of crystals identical with those of Crop B was obtained from the remaining mother liquor by distillation of the solvents under reduced pressure, redissolving the residual oil in a minimum amount of ethyl acetate, and diluting with Skelly Solve B.

Crop A was recrystallized twice from a mixture of ethyl acetate and Skelly Solve B and once from a mixture of acetone and Skelly Solve B to give 240 milligrams of 3α,11α,17α-trihydroxypregnan-20-one as needles; melting point 184–186 degrees centigrade; $[\alpha]_D^{23}$ plus 52 degrees in acetone.

Analysis:
  Calculated for C₂₁H₃₄O₄ ------- C, 71.9; H, 9.71
  Found ---------------------- C, 72.2; H, 9.53
                               C, 72.3; H, 9.66

Crop B was recrystallized once from a mixture of ethyl acetate and Skelly Solve B and once from a mixture of acetone and Skelly Solve B to give 275 milligrams of 3α,11β,17α-trihydroxypregnan-20-one as plates; melting point 213–216 degrees centigrade; $[\alpha]_D^{23}$ plus 73 degrees in acetone.

Analysis:
  Calculated for C₂₁H₃₄O₄ ------- C, 71.9; H, 9.71
  Found ---------------------- C, 72.1; H, 9.81

PREPARATION 3.—3β-ACETOXYPREGNANE-11,20-DIONE

3β-hydroxypregnane-11,20-dione [Von Euw, Lardon, and Reichstein, Helv. Chim. Acta, 27, 821 (1944)], 8.18 grams, was dissolved in a mixture of fifty milliliters of acetic anhydride and two milliliters of pyridine, and the resulting solution was allowed to stand at room temperature for 24 hours. The mixture was then poured into 325 milliliters of water and allowed to stand at room temperature for several hours to permit decomposition of the excess acetic anhydride. The solid product was removed by filtration and dried under vacuum. Two recrystallizations from aqueous acetone gave 2.75 grams, melting point 155–162 degrees centigrade. Repeated recrystallization from aqueous acetone gave 3β-acetoxy-pregnane-11,20-dione; melting point 164–165 degrees centigrade; $[\alpha]_D^{24}$ plus 99 degrees in chloroform.

Analysis:
  Calculated for C₂₃H₃₄O₄ ------ C, 73.90; H, 9.10
  Found ---------------------- C, 73.69; H, 9.02
                               C, 73.64; H, 8.77

PREPARATION 4.—3β,11,20-TRIACETOXY-9(11),17(20)-PREGNADIENE

A mixture of 2.75 grams of 3β-acetoxypregnane-11,20-dione from Preparation 3, 0.73 gram of para-toluenesulfonic acid mono-hydrate, and ninety milliliters of acetic anhydride was heated to boiling and allowed to distil slowly for three hours, 71 milliliters of distillate being collected. Another fifteen milliliters of distillate was collected by distillation under reduced pressure, and the resulting residue was cooled, diluted with 85 milliliters of ether, washed with one percent aqueous sodium bicarbonate solution and with water, and dried over anhydrous sodium sulfate. After removing the drying agent by filtration, the ether was removed by distillation giving 3.5 grams of 3β,11,20-triacetoxy-9(11),17(20)-pregnadiene as a glass.

PREPARATION 5.—17(20)-OXIDO-3β,11,20-TRIACETOXY-9(11)-PREGNENE

3β,11,20-triacetoxy-9(11),17(20)-pregnadiene, 3.5 grams, from Preparation 4 was dissolved in seventeen milliliters of chloroform and the resulting solution cooled to a temperature of zero to five degrees centigrade. A mixture of 170 milligrams of anhydrous sodium acetate and 7.7 milliliters of 38 percent peracetic acid was added with stirring, the temperature of the reaction mixture being maintained at zero to five degrees centigrade. The resulting mixture was stirred at this temperature for ten minutes, then allowed to come to room temperature, and stirred for an additional ninety minutes. The mixture then was diluted with eighty milliliters of ether, washed with four fifteen-milliliter portions of five percent aqueous sodium hydroxide solution, and three fifteen-milliliter portions of water, and dried over anhydrous sodium sulfate. Removal of the drying agent by filtration and distillation of the solvents under reduced pressure gave 3.5 grams of 17(20)-oxido-3β,11,20-triacetoxy-9(11)-pregnene as a viscous oil.

PREPARATION 6.—3β,17α-DIHYDROXYPREGNANE-11,20-DIONE

The 17(20)-oxido-3β,11,20-triacetoxy-9(11)-pregnene from Preparation 5, 3.5 grams, was dissolved in 66 milliliters of alcohol, 66 milliliters of 0.5 normal aqueous sodium hydroxide solution added, and the resulting mixture stirred for thirty hours at room temperature under a nitrogen atmosphere. The mixture was poured into 250 milliliters of water, and the resultant slurry extracted with four fifty-milliliter portions of chloroform. Distillation of the extraction solvent gave 2.74 grams of crude 3β,17α-dihydroxypregnane-11,20-dione.

PREPARATION 7.—3β,17α-DIHYDROXYPREGNANE-11,20-DIONE 20-ETHYLENE GLYCOL KETAL

In the same manner as given in Preparation 1, 3β,17α-dihydroxypregnane-11,20-dione 20-ethylene glycol ketal is prepared from 3β,17α-dihydroxypregnane-11,20-dione from Preparation 6 by reaction with ethylene glycol in the presence of para-toluene-sulfonic acid.

PREPARATION 8.—3β,11α,17α-TRIHYDROXYPREGNAN-20-ONE AND 3β,11β,17α-TRIHYDROXYPREGNAN-20-ONE

One gram of 3β,17α-dihydroxypregnane-11,20-dione 20-ethylene glycol ketal from Preparation 7 was dissolved in fifteen milliliters of benzene, reduced with one gram of lithium aluminum hydride in 150 milliliters of ether, and subsequently hydrolyzed with acid using the procedure of Preparation 2. The ratio was about three parts of 3β,11α,17α-trihydroxypregnan-20-one to about five parts of 3β,11β,17α-trihydroxypregnan-20-one.

Analysis of 3β,11α,17α-trihydroxypregnan-20-one:
　　Calculated for $C_{21}H_{34}O_4$_____ C, 71.9; H, 9.71
　　Found _____ C, 71.8; H, 9.82

Analysis of 3β,11β,17α-trihydroxypregnan-20-one:
　　Calculated for $C_{21}H_{34}O_4$_____ C, 71.9; H, 9.71
　　Found _____ C, 72.0; H, 9.72

PREPARATION 9.—11α-HYDROXYPROGESTERONE

A medium was prepared from five milliliters of corn steep liquor, twenty grams of Edamine commercial lactalbumin digest, and fifty milligrams of Cerelose commercial dextrose, per liter of tap water and adjusted to a pH of between about 5.5 and about 5.9. To four liters of this medium containing a 32 to 48 hour growth, at room temperature with aeration, of Rhizopus arrhizus, was added one gram of progesterone in fifty milliliters of acetone. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5 percent ether, benzene plus 5 percent ether, benzene plus 10 percent ether, benzene plus 10 percent ether, benzene plus 10 percent ether, benzene plus 50 percent ether, benzene plus 50 percent ether, ether, ether, ether plus 5 percent chloroform, ether plus 5 percent chloroform, ether plus 10 percent chloroform, ether plus 10 percent chloroform, ether plus 50 percent chloroform, ether plus 50 percent chloroform, chloroform, chloroform, chloroform plus 5 percent acetone, chloroform plus 5 percent acetone, chloroform plus 10 percent acetone, chloroform plus 10 percent acetone, chloroform plus 50 percent acetone, chloroform plus 50 percent acetone, acetone, acetone, acetone plus 5 percent methanol, acetone plus 5 percent methanol, acetone plus 10 percent methanol, acetone plus 10 percent methanol, acetone plus 50 percent methanol, acetone plus 50 percent methanol. The chloroform and chloroform plus five percent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A sample recrystallized from methanol gave the following constants: melting point, 166–167 degrees centigrade $[α]_D^{20}$ plus 175.9 degrees (chloroform).

Analysis:
　　Calculated for $C_{21}H_{30}O_3$_____ C, 76.4; H, 9.10
　　Found _____ C, 76.6; H, 8.92

The structure of this product was further established by its conversion, with chromic acid in acetic acid, to 11-ketoprogesterone [Reichstein, Helv. Chim. Acta, 23, 684 (1940); ibid., 26, 721 (1943)].

PREPARATION 10.—11α-HYDROXYPREGNANE-3,20-DIONE

A solution of 250 milligrams of 11α-hydroxyprogesterone from Preparation 9 in 100 milliliters of ethanol containing six drops of triethylamine was subjected to hydrogenation at room temperature under a pressure of about ten pounds of hydrogen in the presence of 45 milligrams of a thirty percent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skelly Solve B. On standing, the extract deposited eighty milligrams (32 percent) of 11α-hydroxypregnane-3,20-dione as feathery needles which melted at 85–90 degrees centigrade. Recrystallization from a mixture of about six drops of ethyl acetate and five milliliters of Skelly Solve B did not change the melting point.

Analysis:
　　Calculated for $C_{21}H_{32}O_3$_____ C, 75.86; H, 9.70
　　Found _____ C, 76.13; H, 9.63

PREPARATION 11.—3α,11α-DIHYDROXYPREGNAN-20-ONE

To a solution of 5.31 grams of 11α-hydroxypregnane-3,20-dione of Preparation 10 in 130 milliliters of peroxide-free dioxane maintained at fifty degrees centigrade in a water bath was added a solution of 195.5 milligrams of sodium borohydride (assay 84 percent) in five milliliters of water. The mixture was stirred for one hour at fifty degrees centigrade, filtered, acidified with three normal aqueous hydrochloric acid solution, and evaporated under reduced pressure. The residue was crystallized from fifty milliliters of ethyl acetate to give 1.95 grams (36 percent) of 3α,11α-dihydroxypregnan-20-one, which melted at 180–182 degrees centigrade. An additional 0.2 gram melting at 181–183 degrees centigrade was obtained from the filtrate, total yield, 2.15 grams (40 percent).

PREPARATION 12.—11α-ACETOXYPREGNANE-3,20-DIONE

A mixture of 70.5 milligrams of 11α-hydroxypregnane-3,20-dione from Preparation 10, 0.8 milliliter of acetic anhydride and 0.7 milliliter of pyridine was allowed to stand for sixteen hours at room temperature and then poured into ice water. The precipitated product was isolated by filtration and dried. The yield of 11α-acetoxypregnane-3,20-dione, melting at 143.5–146.5 degrees centigrade, was 67 milligrams (84 percent). After one recrystallization from ether-Skelly Solve B, the melting point was 150–151 degrees centigrade; $[α]_D^{23}$=plus 63 degrees (c=0.803 in chloroform).

Analysis:
　　Calculated for $C_{23}H_{34}O_4$_____ C, 73.76; H, 9.15
　　Found _____ C, 73.93; H, 9.32

In the same manner, other 11α-acyloxypregnane-3,20-diones are prepared from 11α-hydroxypregnane-3,20-dione, including 11α-formyloxypregnane-3,20-dione (using formic acid as the acylating agent); 11α-propionoxypregnane-3,20-dione; 11α-butyryloxypregnane-3,20-dione; 11α-octanoyloxypregnane-3,20-dione; and the like.

PREPARATION 13.—3α,11α,20-TRIACETOXY-17(20)-PREGNENE

Four hundred and five (405) milligrams of 3α,11α-dihydroxypregnan-20-one from Preparation 11, 200 milligrams of paratoluenesulfonic acid monohydrate and seventy milliliters of acetic anhydride were heated to distillation temperature and allowed to distil slowly for three and one-half hours. A total of sixty milliliters of distillate was collected. The residue was cooled to room temperature, poured into ice-water, and the resulting crystalline product collected and washed with water.

Recrystallization from acetone-water yielded 332 milligrams of 3α,11α,20-triacetoxy-17(20)-pregnene, melting at 200–203 degrees centigrade.

PREPARATION 14.—3β,11α,20-TRIACETOXY-17(20)-PREGNENE

Using the procedure described in Preparation 13, 3β-hydroxy-11α-acetoxypregnan-20-one (prepared by the reduction of the 11α-acetoxypregnane-3,20-dione of Preparation 12 with hydrogen at two to three atmospheres pressure in methanol at room temperature using a Raney nickel catalyst), is converted to 3β,11α,20-triacetoxy-17(20)-pregnene with acetic anhydride in the presence of para-toluenesulfonic acid.

In the same manner as given above in Preparation 13 and Preparation 14, other 3α(or β),11α,20-triacyloxy-17(20)-pregnenes are prepared, including 3α,11α,20-tripropionoxy-17(20)-pregnene; 3β,11α,20-tripropionoxy-17(20)-pregnene; 3β,20-diacetoxy-11α-formyloxy-17(20)-pregnene; 3β,20-dipropionoxy-11α-acetoxy-17(20)-pregnene; 3α,11α,20-trioctanoyloxy-17(20)-pregnene; 3β,20-dioctanoyloxy-11α-propionoxy-17(20)-pregnene; 3α,11α,20-tributyroyloxy-17(20)-pregnene; 3α,11α,20-trivaleroyloxy-17(20)-pregnene; 3α,11α,20-trihexanoyloxy-17(20)-pregnene; 3α,11α,20-triheptanoyloxy-17(20)-pregnene; and 3α,11α,20-trioctanoyloxy-17(20)-pregnene.

PREPARATION 15.—17(20)-OXIDO-3α,11α,20-TRIACETOXYPREGNANE

One and one-half grams of 3α,11α,20-triacetoxy-17(20)-pregnene (Preparation 13) was dissolved in 7.5 milliliters of chloroform, and the solution was cooled in an ice bath to about five degrees centigrade. Three and three-tenths milliliters of commercial grade forty percent peracetic acid solution in which 100 milligrams of sodium acetate had been dissolved was added, and the resulting mixture was then shaken on a mechanical shaking machine for about two hours at room temperature to complete the reaction. The mixture containing the crude product was diluted with fifty milliliters of methylene chloride and then washed with several 25-milliliter portions of ice-cold five percent aqueous sodium hydroxide solution followed by 25-milliliter portions of water until the wash solution was neutral to pH test paper. The neutral solution was dried with anhydrous sodium sulfate and then filtered to remove the drying agent. The white crystalline residue obtained on evaporating the solvent from the clear, dry solution melted at 210–213 degrees centigrade. Recrystallization from a mixture of ethyl acetate and Skelly Solve B gave fluffy needles of 17(20)-oxido-3α,11α-20-triacetoxypregnane, melting at 214–217 degrees centigrade.

Analysis:
    Calculated for $C_{27}H_{40}O_7$ _____ C, 68.04; H, 8.46
    Found _____ C, 68.33; H, 8.62
                                          C, 67.90; H, 8.38

PREPARATION 16.—17(20)-OXIDO-3β,11α,20-TRIACETOXYPREGNANE

Using this procedure described in Preparation 15, 3β,11α,20-triacetoxy-17(20)-pregnene from Preparation 14 is converted to 17(20)-oxido-3β,11α,20-triacetoxypregnane by oxidation with peracetic acid in the presence of sodium acetate.

In the same manner as given above in Preparation 15 and Preparation 16, other 17(20)-oxido-3α(or β),11α,20-triacyloxy pregnanes are prepared from the corresponding 3α(or β),11α,20-triacyloxy-17(20)-pregnenes, including 17(20)-oxido-3α,11α,20-tripropionoxypregnane; 17(20)-oxido-3β,11α,20-tripropionoxypregnane; 11α-acetoxy-3β,20-dipropionoxy-17(20)-oxidopregnane; 11α-formyloxy-3β,20-diacetoxy-17(20)-oxidopregnane; 17(20)-oxido-3α,11α,20-trioctanoyloxypregnane; 3β,20-dioctanoyloxy-17(20)-oxido-11α-propionoxypregnane; 17(20)-oxido-3α,11α-20-tributyryloxypregnane; 17(20)-oxido-3α,11α,20-trivaleryloxypregnane; 17(20)-oxido-3α,11α,20-trihexanoyloxypregnane; 17(20)-oxido-3α,11α,20-triheptanoyloxypregnane; 17(20)-oxido-3α,11α,20-trioctanyloxypregnane; and the like.

PREPARATION 17.—11α-ACETOXY-3α,17α-DIHYROXYPREGNAN-20-ONE AND 3α,11α,17α-TRIHYDROXYPREGNAN-20-ONE

Nine hundred milligrams of 17(20)-oxido-3α,11α,20-triactaoxypregnane (Preparation 15) was dissolved in fifty milliliters of alcohol, and to the resulting solution was added with swirling 11.3 milliliters of a 0.5 normal aqueous sodium hydroxide solution. After standing at room temperature for thirty minutes, the solution was extracted with chloroform, and the chloroform extract was then washed with twenty percent aqueous sodium chloride solution and dried with anhydrous sodium sulfate. The drying agent was removed by filtration, and the solvent was removed by evaporation under reduced pressure giving the product as a colorless, viscous oil. The oil was dissolved in 100 milliliters of benzene, and the solution was passed through a chromatographic column packed with ninety grams of Florisil magnesium silicate to absorb the product. The product was eluted from the column by washing with the following solvent mixtures in succession: Ten 100-milliliter portions of 5 percent acetone and 95 percent Skelly Solve B, ten 100-milliliter portions of 10 percent acetone and 90 percent Skelly Solve B, and ten 100-milliliter portions of 20 percent acetone and 80 percent Skelly Solve B. On evaporation of the solvents from the various fractions, the product had been separated into two parts, both colorless viscous oils. The product from the first fractions was 11α-acetoxy-3α,17α-dihydroxypregnan-20-one, as confirmed by analytical data, and the product from the later fractions was 3α,11α,17α-trihydroxypregnan-20-one, identical with the 3α,11α,17α-trihydroxypregnan-20-one obtained in Preparation 2. The ratio was about one part of the acetoxy compound for every nine parts of the trihydroxy compound.

Analysis of 11α-acetoxy-3α,17α-dihydroxypregnan-20-one:
    Calculated for $C_{23}H_{36}O_5$ _____ C, 70.37; H, 9.25
    Found _____ C, 70.30; H, 9.30

PREPARATION 18.—11α-ACETOXY-3β,17α-DIHYDROXYPREGNAN-20-ONE AND 3β,11α,17α-TRIHYDROXYPREGNAN-20-ONE

Using the procedure described in Preparation 17, an alcohol solution of 17(20)-oxido-3β,11α,20-triacetoxypregnane (Preparation 16) was converted by treatment with an aqueous sodium hydroxide solution to an oily product which was separated into 11α-acetoxy-3β,17α-dihydroxypregnan-20-one and 3β,11α,17α-trihydroxypregnan-20-one, as confirmed by analytical data. The ratio was about one part of the acetoxy compound for every ten parts of the trihydroxy compound.

Analysis of 11α-acetoxy-3β,17α-dihydroxypregnan-20-one:
    Calculated for $C_{23}H_{36}O_5$ _____ C, 70.37; H, 9.25
    Found _____ C, 70.43; H, 9.19

Analysis of 3β,11α,17α-trihydroxypregnan-20-one:
    Calculated for $C_{21}H_{34}O_4$ _____ C, 71.96; H, 9.78
    Found _____ C, 71.80; H, 9.82

In the same manner as given above in Preparation 17 and Preparation 18, other 11α-acyloxy-3α(or β),17-dihydroxypregnan-20-ones are prepared, including 3α,17α-dihydroxy-11α-formyloxypregnane-20-one; 3α,17α-dihydroxy-11α-propionoxypregnan-20-one; 3β,17-dihydroxy-11α-propionoxypregnan-20-one; 11α-butyryloxy-3α,17-dihydroxypregnan-20-one; 3α,17-dihydroxy-11α-valeryloxypregnan-20-one; 3α,17-dihydroxy-11α-hexanoyloxypregnan-20-one; 3α,17-dihydroxy-11α-heptanoyloxypregnan- 20-one; 3α,17-dihydroxy-11α-octanoyloxypregnan-20-one; and the like, depending on the starting material employed.

PREPARATION 19.—21-BROMO-3α,11α,17α-TRIHYDROXYPREGNAN-20-ONE

3α,11α,17α-trihydroxypregnan-20-one (Preparation 2 or 17), dissolved in chloroform, is treated with a solution of bromine in chloroform at about forty degrees centigrade. After completion of the bromination, the chloroform is distilled to give a theoretical yield of 21-bromo-3α,11α,17α-trihydroxypregnan-20-one; melting point 122.5 to 127 degrees centigrade.

PREPARATION 20.—21-BROMO-3α,11β,17α-TRIHYDROXYPREGNAN-20-ONE

3α,11β,17α-trihydroxypregnan-20-one (Preparation 2), brominated as in Preparation 19 yields 21-bromo-3α,11β,17α-trihydroxypregnan-20-one in nearly quantitative yield.

PREPARATION 21.—21-BROMO-3β,11α,17α-TRIHYDROXYPREGNAN-20-ONE

Bromination of 3β,11α,17α-trihydroxypregnan-20-one (Preparation 8 or 18) using the procedure of Preparation 19 gives 21-bromo-3β,11α,17α-trihydroxypregnan-20-one in high yield.

PREPARATION 22.—21-BROMO-3β,11β,17α-TRIHYDROXYPREGNAN-20-ONE

Treatment of 3β,11β,17α-trihydroxypregnan-20-one (Preparation 8) with bromine in chloroform, according to the procedure of Preparation 19 yields 21-bromo-3β,11β,17α-trihydroxypregnan-20-one.

PREPARATION 23.—21-BROMO-11α-ACETOXY-3α,17α-DIHYDROXYPREGNAN-20-ONE

11α-acetoxy-3α,17α-dihydroxypregnan-20-one (Preparation 17) brominated by the method of Preparation 19 gives a nearly quantitative yield of 21-bromo-11α-acetoxy 3α,17α-dihydroxypregnan-20-one.

In the same manner, other 21-bromo-11α-acyloxy-3α,17α-dihydroxypregnan-20-ones are prepared from corresponding 11α-acyloxy-3α,17α-dihydroxypregnan-20-ones, including 21-bromo-11α-formyloxy-3α,17α-dihydroxypregnane-20-one; 21-bromo-11α-propionoxy-3α,17α-dihydroxypregnan-20-one; 21-bromo-11α-butyryloxy-3α,17α-dihydroxypregnan-20-one; 21-bromo-11α-valeryloxy-3α,17α-dihydroxypregnan-20-one; 21-bromo-11α-hexanoyloxy-3α,17α-dihydroxypregnan-20-one; 21-bromo-11α-heptanoyloxy-3α,17α-dihydroxypregnan-20-one; 21-bromo-11α-octanoyloxy-3α,17α-dihydroxypregnan-20-one; and the like.

PREPARATION 24.—21-BROMO-11α-ACETOXY-3β,17α-DIHYDROXYPREGNAN-20-ONE

Bromination of 11α-acetoxy-3β,17α-dihydroxypregnan-20-one (Preparation 18), using the method of Preparation 19, gives 21-bromo-11α-acetoxy-3β,17α-dihydroxypregnan-20-one in nearly theoretical amounts.

In the same manner other 21-bromo-11α-acyloxy-3β,17α-dihydroxypregnan-20-ones are prepared from corresponding 11α-acyloxy-3β,17α-dihydroxypregnan-20-ones, including 21-bromo-11α-formyloxy-3β,17α-dihydroxypregnane-20-one; 21-bromo-11α-propionoxy-3β,17α-dihydroxypregnan-20-one; 21-bromo-11α-butyryloxy-3β,17α-dihydroxypregnan-20-one; 21-bromo-11α-valeryloxy-3β,17α-dihydroxypregnan-20-one; 21-bromo-11α-hexanoyloxy-3β,17α-dihydroxypregnan-20-one; 21-bromo-11α-heptanoyloxy-3β,17α-dihydroxypregnan-20-one; 21-bromo-11α-octanoyloxy-3β,17α-dihydroxypregnan-20-one; and the like.

PREPARATION 25.—21-CHLORO-3α,11α,17α-TRIHYDROXYPREGNAN-20-ONE

A solution of 3α,11α,17α-trihydroxypregnan-20-one (Preparation 2 or 17) in carbon tetrachloride is treated with chlorine, dissolved in carbon tetrachloride, at about room temperature. Distillation of the carbon tetrachloride solvent gives 21-chloro-3α,11α,17α-trihydroxypregnan-20-one in excellent yield.

In the same manner other 21-chloro-3,17α-dihydroxy-11-oxygenated-pregnan-20-ones are obtained from corresponding 3,17α-dihydroxy-11-oxygenated-pregnan-20-ones, including 21-chloro-3α,11β,17α-trihydroxypregnan-20-one; 21-chloro-3β,11α,17α-trihydroxypregnan-20-one; 21-chloro-3β,11β,17α-trihydroxypregnan-20-one; 21-chloro-11α-acetoxy-3α,17α-dihydroxypregnan-20-one; 21-chloro-11α-propionoxy-3α,17α-dihydroxypregnan-20-one; 21-chloro-11α-butyryloxy-3α,17α-dihydroxypregnan-20-one; 21-chloro-11α-valeryloxy-3α,17α-dihydroxypregnan-20-one; 21-chloro-11α-hexanoyloxy-3α,17α-dihydroxypregnan-20-one; 21-chloro-11α-heptanoyloxy-3α,17α-dihydroxypregnan-20-one; 21-chloro-11α-octanoyloxy-3α,17α-dihydroxypregnan-20-one; 21-chloro-11α-formyloxy-3β,17α-dihydroxypregnane-20-one; 21-chloro-11α-acetoxy-3β,17α-dihydroxypregnan-20-one; 21-chloro-11α-propionoxy-3β,17α-dihydroxypregnan-20-one; 21-chloro-11α-butyryloxy-3β,17α-dihydroxypregnan-20-one; 21-chloro-11α-valeryloxy-3β,17α-dihydroxypregnan-20-one; 21-chloro-11α-hexanoyloxy-3β,17α-dihydroxypregnan-20-one; 21-chloro-11α-heptanoyloxy-3β,17α-dihydroxypregnan-20-one; 21-chloro-11α-octanoyloxy-3β,17α-dihydroxypregnan-20-one; and the like.

PREPARATION 26.—21-ACETOXY-3α,11α,17α-TRIHYDROXYPREGNAN-20-ONE 21-bromo-3α,11α,17α-trihydroxypregnan-20-one (Preparation 19), dissolved in acetone is heated for about sixteen hours under reflux with excess anhydrous potassium acetate in the presence of a trace of potassium iodide and a trace of acetic acid. The resulting solution is cooled and then diluted with water to precipitate the 21-acetoxy-3α,11α,17α-trihydroxypregnan-20-one; melting point 185 to 189 degrees centigrade. The yield is nearly quantitative.

In the same manner other 21-acyloxy-3α,11α,17α-trihydroxypregnan-20-ones are prepared from 21-bromo-3α,11α,17α-trihydroxypregnan-20-one, and the appropriate potassium acylate, including 21-formyloxy-3α,11α,17α-trihydroxypregnan-20-one; 21-propionoxy-3α,11α,17α-trihydroxypregnan-20-one; 21-butyryloxy-3α,11α,17α-trihydroxypregnan-20-one; 21-valeryloxy-3α,11α,17α-trihydroxypregnan-20-one; 21-hexanoyloxy-3α,11α,17α-trihydroxypregnan-20-one; 21-heptanoyloxy-3α,11α,17α-trihydroxypregnan-20-one; 21-octanoyloxy-3α,11α,17α-trihydroxypregnan-20-one; and the like.

PREPARATION 27.—21-ACETOXY-3α,11β,17α-TRIHYDROXYPREGNAN-20-ONE

Replacement of the bromine atom in 21-bromo-3α,11β,17α-trihydroxypregnan-20-one (Preparation 20) by an acetoxy group is accomplished in the same manner as in Preparation 26. The yield of 21-acetoxy-3α,11β,17α-trihydroxypregnan-20-one is the theoretical amount.

In the same manner other 21-acyloxy-3α,11β,17α-trihydroxy-pregnan-20-ones are prepared from 21-bromo-3α,11β,17α-trihydroxypregnan-20-one and the appropriate potassium acylate, including 21-formyloxy-3α,11β,17α-trihydroxypregnan-20-one; 21-propionoxy-3α,11β,17α-trihydroxypregnan-20-one; 21-butyryloxy-3α,11β,17α-trihydroxypregnan-20-one; 21-valeryloxy-3α,11β,17α-trihydroxypregnan-20-one; 21-hexanoyloxy-3α,11β,17α-trihydroxypregnan-20-one; 21-heptanoyloxy-3α,11β,17α-trihydroxypregnan-20-one; 21-octanoyloxy-3α,11β,17α-trihydroxypregnan-20-one; and the like.

PREPARATION 28.—21-ACETOXY-3β,11α,17α-TRIHYDROXYPREGNAN-20-ONE 21-bromo-3β,11α,17α-trihydroxypregnan-20-one (Preparation 21) is converted to 21-acetoxy-3β,11α,17α-trihydroxypregnan-20-one by the method of Preparation 26.

In the same manner other 21-acyloxy-3β,11α,17α-trihydroxypregnan-20-ones are prepared from 21-bromo- 3β,11α,17α-trihydroxypregnan-20-one and the appropriate potassium acylate, including 21-formyloxy-3β,11α,17α-trihydroxypregnan-20-one; 21-propionoxy-3β,11α,17α-trihydroxypregnan-20-one; 21-butyryloxy-3β,11α,17α-trihydroxypregnan-20-one; 21-valeryloxy-3β,11α,17α-trihydroxypregnan-20-one; 21-hexanoyloxy-3β,11α,17α-trihydroxypregnan-20-one; 21-heptanoyloxy-3β,11α,17α-trihydroxypregnan-20-one; 21-octanoyloxy-3β,11α,17α-trihydroxypregnan-20-one; and the like.

PREPARATION 29.—21-ACETOXY-3β,11β,17α-TRIHYDROXYPREGNAN-20-ONE

According to the procedure of Preparation 26, 21-bromo-3β,11β,17α-trihydroxypregnan-20-one (Preparation 22) is converted to 21-acetoxy-3β,11β,17α-trihydroxypregnan-20-one in high yield.

In the same manner other 21-acyloxy-3β,11β,17α-trihydroxypregnan-20-ones are prepared from 21-bromo-3β,11β,17α-trihydroxypregnan-20-one and the appropriate potassium acylate, including 21-formyloxy-3β,11β,17α-trihydroxypregnan-20-one; 21-propionoxy-3β,11β,17α-trihydroxypregnan-20-one; 21-butyryloxy-3β,11β,17α-trihydroxypregnan-20-one; 21-valeryloxy-3β,11β,17α-trihydroxypregnan-20-one; 21-hexanoyloxy-3β,11β,17α-trihydroxypregnan-20-one; 21-heptanoyloxy-3β,11β,17α-trihydroxypregnan-20-one; 21-octanoyloxy-3β,11β,17α-trihydroxypregnan-20-one; and the like.

PREPARATION 30.—11α,21-DIACETOXY-3α,17α-DIHYDROXYPREGNAN-20-ONE

Using the method of Preparation 26, 11α,21-diacetoxy-3,17α-dihydroxypregnan-20-one is produced from 21-bromo-11α-acetoxy-3α,17α-dihydroxypregnan-20-one (Preparation 23).

In the same manner other 11α,21-diacyloxy-3α,17α-dihydroxypregnan-20-ones are prepared from the appropriate 21-bromo-11α-acyloxy-3α,17α-dihydroxypregnan-20-one and the appropriate potassium acylate, including 21-acetoxy-11α-formyloxy-3α,17α-dihydroxypregnan-20-one; 21-propionoxy-11α-acetoxy-3α,17α-dihydroxypregnan-20-one; 21-butyryloxy-11α-acetoxy-3α,17α-dihydroxypregnan-20-one; 21-valeryloxy-11α-acetoxy-3α,17α-dihydroxypregnan-20-one; 21-hexanoyloxy-11α-acetoxy-3α,17α-dihydroxypregnan-20-one; 21-heptanoyloxy-11α-acetoxy-3α,17α-dihydroxypregnan-20-one; 21-octanoyloxy-11α-acetoxy-3α,17α-dihydroxypregnan-20-one; 11α,21-dipropionoxy-3α,17α-dihydroxypregnan-20-one; 11α,21-dibutyryloxy-3α,17α-dihydroxypregnan-20-one; 11α,21-dihexanoyloxy-3α,17α-dihydroxypregnan-20-one; 11α,21-dicotanoyloxy-3α,17α-dihydroxypregnan-20-one; 21-acetoxy-11α-propionoxy-3α,17α-dihydroxypregnan-20-one; and the like.

PREPARATION 31.—11α,21-DIACETOXY-3β,17α-DIHYDROXYPREGNAN-20-ONE 21-bromo-11α-acetoxy-3β,17α-dihydroxypregnan-20-one (Preparation 24) is treated with potassium acetate according to the procedure of Preparation 26 to give 11α,21-diacetoxy-3β,17α-dihydroxypregnan-20-one in high yield.

In the same manner other 11α,21-diacyloxy-3β,17α-dihydroxypregnan-20-ones are prepared from the appropriate-21-bromo-11α-acyloxy-3β,17α-dihydroxypregnan-20-one and the appropriate potassium acylate, including 21-formyloxy-11α-acetoxy-3β,17α-dihydroxypregnan-20-one; 21-propionoxy-11α-acetoxy-3β,17α-dihydroxypregnan-20-one; 21-butyryloxy-11α-acetoxy-3β,17α-dihydroxypregnan-20-one; 21-valeryloxy-11α-acetoxy-3β,17α-dihydroxypregnan-20-one; 21-hexanoyloxy-11α-acetoxy-3β,17α-dihydroxypregnan-20-one; 21-heptanoyloxy-11α-acetoxy-3β,17α-dihydroxypregnan-20-one; 21-octanoyloxy-11α-acetoxy-3β,17α-dihydroxypregnan-20-one; 11α,21-dipropionoxy-3β,17α-dihydroxypregnan-one; 11α,21-dibutyryloxy-3β,17α-dihydroxypregnan-20-one; 11α,21-dihexanoyloxy-3β,17α-dihydroxypregnan-20-one; 11α,21-dioctanoyloxy-3β,17α-dihydroxypregnan-20-one; 21-acetoxy-11α-propionoxy-3β,17α-dihydroxypregnan-20-one; and the like.

The 21-acyloxysteroids obtained in Preparation 26 through Preparation 31 from the 21-bromosteroids may also be obtained in the same manner by substituting the corresponding 21-chlorosteroid (Preparation 25) for the 21-bromosteroid specified.

Example 1.—4-chloro-17α-hydroxypregnane-3,11,20-trione

A solution of 25 grams of 3α,17α-dihydroxypregnane-11,20-dione [Sarett, J. Am. Chem. Soc., 70, 1454 (1948)] in 380 milliliters of tertiary-butyl alcohol is admixed with five milliliters of concentrated hydrochloric acid and twelve milliliters of water, and thereafter cooled to about fifteen degrees centigrade. Eighteen milliliters (2.2 molar equivalents) of tertiary-butyl hypochlorite is then added thereto, whereupon the temperature rises to about 26 degrees centigrade. The reaction mixture is stirred for 4.5 hours although the iodometric titration of an aliquot sample taken from the reaction mixture after two hours shows the reaction to be essentially complete. The volatile components of the reaction mixture then are removed by distillation under reduced pressure leaving a 24.6 gram residue (a yield of 91 percent of the theoretical, corrected for the samples taken from the reaction mixture for iodometric titrations) of 4-chloro-17α-hydroxypregnane-3,11,20-trione which melts without purification at 220 to 225 degrees centigrade and has an $[\alpha]_D^{25}$ of plus 91 degrees (acetone).

In the same manner 3β,17α-dihydroxypregnane-11,20-dione (Preparation 6) is converted to 4-chloro-17α-hydroxypregnane-3,11,20-trione. 4-chloro-17α-hydroxypregnane-3,11,20-trione is a stable, readily purifiable compound having a well defined crystalline structure. Unlike 4-bromo-17α-hydroxypregnane-3,11,20-trione, said compound does not decompose on standing and is storable for long periods without decomposition. Treatment of said compound with semicarbazide hydrochloride and thereafter with pyruvic acid is productive of the known 17α-hydroxy-4-pregnene-3,11,20-trione [Kritchevsky et al., J. Am. Chem. Soc. 74, 483 (1952)]. Treatment of 4-chloro-17α-hydroxypregnane-3,11,20-trione with bromine in acetic acid is productive of 4-chloro-17α-hydroxy-21-bromopregnane-3,11,20-trione, which, as shown in Example 6, can be converted to cortisone acetate in two steps.

Example 2.—4-chloro-17α-hydroxypregnane-3,11,20-trione

A solution of 0.86 gram (2.5 millimoles) of 3α,17α-dihydroxypregnane-11,20-dione in fifty milliliters of tertiary-butyl alcohol containing 1.5 milliliters of water and 0.2 milliliter of concentrated hydrochloric acid is treated with 1.1 milliliters (10 millimoles) of tertiary-butyl hypochlorite for 20.5 hours. The 4-chloro-17α-hydroxypregnane-3,11,20-trione which precipitates is recovered by filtration and melts with decomposition at 234 to 235 degrees centigrade. The infrared spectrum is consistent with the assigned structure.

Analysis:
Calculated for $C_{21}H_{29}O_4Cl$ _____ Cl, 9.31
Found _____ Cl, 9.24

Example 3.—4-chloro-17α-hydroxy-21-acetoxypregnane-3,11,20-trione

To a solution of 0.50 gram of 3α,17α-dihydroxy-21-acetoxypregnane-11,20-dione [Sarett, J. Am. Chem. Soc., 70, 1454 (1948)] in eighteen milliliters of tertiary-butyl alcohol is added 0.75 milliliter of water, 0.1 milliliter of concentrated hydrochloric acid, and 0.52 milliliter (0.5 gram, 3.69 millimoles) of tertiarybutyl hypochlorite. The resulting solution is diluted to 25 milliliters with tertiary-butyl alcohol and the whole stirred in the dark for about 22 hours. The crystalline precipitate of 4-chloro-17α- hydroxy-21-acetoxypregnane-3,11,20-trione is then filtered, washed with a small portion of tertiary butyl alcohol and air-dried. The yield of precipitated product melting with decomposition at 232 to 236.5 degrees centigrade and having an $[\alpha]_D$ of plus 99 degrees (acetone) is 0.325 gram, a yield of 60.2 percent of the theoretical. The infrared spectrum is consistent with the assigned structure. A further quantity of product remains in the filtrate and is recovered therefrom.

4-chloro-17α - hydroxy - 21 - acetoxypregnane - 3,11,20-trione is dehydrohalogenated by treatment with semicarbazide hydrochloride followed by treatment with pyruvic acid to obtain cortisone acetate.

*Example 4.—4-chloro-17α - hydroxy-21-acetoxypregnane-3,11,20-trione*

In exactly the same manner as described in Example 3, using the same reactants but omitting the hydrochloric acid, 4 - chloro-17α-hydroxy-21-acetoxypregnane-3,11,20-trione precipitates from the reaction mixture in a yield of 48.1 percent of the theoretical. A further quantity of product is isolated by concentration of the resulting filtrate.

*Example 5.—4 - chloro-17α-hydroxy-21-acetoxypregnane-3,11,20-trione*

In exactly the same manner as described in Example 3 and using the same reactants but substituting fifty milligrams of paratoluenesulfonic acid for the hydrochloric acid, 4 - chloro-17α-hydroxy-21-acetoxypregnane-3,11,20-trione precipitates from the reaction mixture in a yield of 51 percent of the theoretical amount. As in Examples 2 and 3, more product is isolated from the remaining filtrate.

In the same manner as shown in Example 3 through Example 5, other 4-chloro-17α-hydroxy-21-acyloxypregnane-3,11,20-triones are prepared from corresponding 3,17α-dihydroxy-21-acyloxypregnane-11,20-dione, including 4-chloro-17α-hydroxy-21-formyloxypregnane-3,11,20-trione; 4 - chloro - 17α - hydroxy-21-propionoxypregnane-3,11,20-trione; 4 - chloro-17α-hydroxy-21-butyryloxypregnane-3,11,20-trione; 4-chloro-17α-hydroxy-21-valeryloxypregnane-3,11,20-trione; 4 - chloro - 17α-hydroxy-21-hexanoyloxypregnane-3,11,20-trione; 4 - chloro-17α-hydroxy-21-heptanoyloxypregnane-3,11,20 - trione; 4 - chloro-17α-hydroxy-21-octanoyloxypregnane-3,11,20-trione; and the like.

*Example 6.—4 - chloro-17α-hydroxy-21-bromopregnane-3,11,20-trione*

A solution of two grams of 3α,17α-dihydroxy-21-bromopregnane-11,20-dione [Kritchevsky et al., J. Am. Chem. Soc., 74, 483 (1952)] in fifty milliliters of tertiary-butyl alcohol containing 1.5 milliliters of water and 0.38 milliliter of concentrated hydrochloric acid is contacted with 1.12 milliliters of tertiary-butyl hypochlorite for 3.5 hours, at the end of which time the hypochlorite is completely consumed. The solution is then diluted with twice its volume of water whereupon the theoretical 2.17 grams of 4 - chloro-17α-hydroxy-21-bromopregnane-3,11,20-trione precipitates.

Analysis:
Calculated for $C_{21}H_{28}ClBrO_4$__ Total halogen, 25.10
Found_____ Total halogen, 24.42

4-chloro-17α-hydroxy-21-bromopregnane-3,11,20-trione also is obtained in exactly the same manner as above using the same reactants but substituting tertiary-amyl hypochlorite for the tertiary-butyl hypochlorite.

4-chloro-17α-hydroxy-21-bromopregnane-3,11,20-trione is a stable compound and does not decompose on standing. The presence of a halogen atom at carbon atom four and at carbon atom 21 renders the compound a valuable precursor to known physiologically active cortical hormones. Dehydrohalogenation with semicarbazide hydrochloride followed by pyruvic acid gives 17α-hydroxy-21-bromo-4-pregnene-3,11,20-trione. Subsequent treatment with potassium acetate in acetone gives cortisone acetate.

*Example 7.—4,21-dichloro-17α-hydroxypregnane-3,11,20-trione*

Treatment of 3α,17α - dihydroxypregnane - 11,20-dione [Sarett, J. Am. Chem. Soc., 70, 1454 (1948)] with chlorine in acetic acid is productive of 3α,17α-dihydroxy-21-chloropregnane-11,20-dione.

In the same manner as described in Example 1, reacting 3α,17α-dihydroxy-21-chloropregnane-11,20-dione with tertiary-butyl hypochlorite in tertiary-butyl alcohol in the presence of water and hydrochloric acid is productive of 4,21-dichloro-17α-hydroxypregnane-3,11,20-trione in high yield.

4,21-dichloro-17α-hydroxypregnane-3,11,20-trione is a stable, well-defined crystalline solid which does not decompose on standing. Dehydrohalogenation followed by treatment with potassium acetate gives cortisone acetate as in Example 6.

*Example 8.—4 - chloro-11α-hydroxypregnane-3,20-dione*

Using the procedure of Example 1, 3α,11α-dihydroxypregnan-20-one (Preparation 11) is converted to 4-chloro-11α-hydroxypregnan - 3,20-dione. Dehydrohalogenation of the product with pyridine yields the known 11α-hydroxyprogesterone.

*Example 9.—4-chloro-17α-hydroxypregnane-3,11,20-trione*

In the same manner as described in Example 1, a solution of 350 milligrams of 3α,11β,17α-trihydroxypregnan-20-one (Preparation 2) in fifteen milliliters of tertiary-butyl alcohol was reacted with 0.22 gram of tertiary-butyl hypochlorite in the presence of water and hydrochloric acid. After ten minutes, all the active chlorine of the reaction mixture had been consumed. The solvent was then distilled at reduced pressure and the theoretical 380 milligram residue recrystallized from isopropyl alcohol to give 4-chloro-17α-hydroxypregnane-3,11,20-trione, identical with the product of Example 1, and which did not depress the melting point of an authentic sample, the yield being almost the theoretical amount.

In the same manner as shown above, 3β,11β,17α-trihydroxypregnan-20-one (Preparation 8) is converted to 4-chloro-17α-hydroxypregnane-3,11,20-trione.

*Example 10.—4-chloro-11α,17α-dihydroxypregnane-3,20-dione*

To a solution of 3α,11α,17α-trihydroxypregnane-20-one (Preparation 2 or 17) in aqueous tertiary-butyl alcohol containing hydrochloric acid is added tertiary-butyl hypochlorite, and, after mixing, the resulting solution is allowed to stand at room temperature with occasional shaking, the procedure of Example 3 being followed. After the theoretical amount of tertiary-butyl hypochlorite is reacted, as determined by iodometric titration, the product begins to precipitate. The crystalline 4 - chloro-11α,17α-dihydroxypregnane-3,20-dione is recovered by filtration. The remainder of the product is obtained as a solid residue when the remaining filtrate is evaporated, the total yield being nearly the theoretical amount; melting point 183 to 185 degrees centigrade.

Analysis:
Calculated for $C_{21}H_{31}O_4Cl$_____ Cl, 9.26
Found _____ Cl, 9.30

In the same manner 3β,11α,17α-trihydroxypregnan-20-one (Preparation 8 or 18) is converted to 4-chloro-11α,17α-dihydroxypregnane-3,20-dione. Mild oxidation of 4-chloro-11α,17α-dihydroxypregnane-3,20-dione with chromic acid in acetic acid solution gives 4-chloro-17α-hydroxypregnane-3,11,20-trione (Example 1).

Example 11.—4-chloro-11α-acetoxy-17α-hydroxypregnane-3,20-dione

11α - acetoxy-3α,17α-dihydroxypregnan-20-one (Preparation 17) is transformed, according to the method of Example 1, into 4-chloro-11α-acetoxy-17α-hydroxypregnane-3,20-dione, the yield being about the theoretical amount. In the same manner 11α-acetoxy-3β,17α-dihydroxypregnan-20-one (Preparation 18) gives 4-chloro-11α - acetoxy - 17α-hydroxypregnane-3,20-dione; melting point 232 to 234 degrees centigrade; $[\alpha]_D^{23}$ plus 33 degrees (in acetone).

Analysis:

Calculated for $C_{23}H_{33}O_5Cl$_____ Cl, 8.34
Found _____ Cl, 8.58

In the same manner other 4-chloro-11α-acyloxy-17α-hydroxypregnane-3,20-diones are prepared from 11α-acyloxy-3α(or β),17α-dihydroxypregnan-20-ones, including 4-chloro-11α-formyloxy-17α-hydroxypregnane-3,20-dione; 4 - chloro-11α-propionoxy-17α-hydroxypregnane-3,20 - dione; 4-chloro-11α-butryloxy-17α-hydroxypregnane-3,20-dione; 4 - chloro-11α-valeryloxy-17α-hydroxypregnane - 3,20 - dione; 4 - chloro-11α-hexanoyloxy-17α-hydroxypregnane-3,20-dione; 4-chloro-11α-heptanoyloxy-17α-hydroxypregnane-3,20-dione; 4-chloro-11α-octanoyloxy-17α-hydroxypregnane-3,20-dione; and the like.

The 4-chloro-11α-acyloxy-17α-hydroxypregnane-3,20-diones may be converted to cortisone acetate by brominating at the 21-position using bromine in acetic acid to produce the 21-bromo-4-chloro-11α-acyloxy-17α-hydroxypregnane-3,20-diones, dehydrohalogenating with pyridine to remove hydrogen chloride and obtain 21-bromo-11α-acyloxy-17α-hydroxy-4-pregnene-3,20-diones, hydrolyzing the 21-bromine and the 11α-acyloxy group to produce 11α,17α,21-trihydroxy-4-pregnene-3,20-dione using sodium hydroxide in aqueous alcohol, acetylating the 21-hydroxyl group with one equivalent of acetic anhydride in pyridine to produce 21-acetoxy-11α,17α-dihydroxy-4-pregnene-3,20-dione, and mildly oxidizing the 11α-hydroxy group with chromic acid in acetic acid to produce an eleven-keto group.

Example 12.—4-chloro-21-bromo-11α,17α-dihydroxypregnane-3,20-dione

Following the method of Example 6, 21-bromo-3α,-11α,17α-trihydroxypregnan - 20 - one (Preparation 19) gives 4 - bromo - 21-bromo-11α,17α-dihydroxypregnane-3,20-dione in excellent yield. In the same manner 4-chloro - 21 - bromo - 11α,17α - dihydroxypregnane-3,20-dione is obtained from 21-bromo-3β,11α,17α-trihydroxypregnan-20-one (Preparation 21).

Mild oxidation of the 11α-hydroxy group of 4-chloro-21-bromo-11α,17α-dihydroxypregnane-3,20-dione gives 4-chloro - 21 - bromo-17α-hydroxypregnane-3,11,20-trione which can be converted to cortisone acetate as shown in Example 6.

Example 13.—4-chloro-21-bromo-17α-hydroxypregane-3,11,20-trione

According to the procedure of Example 9, 21-bromo-3α,11β,17α-trihydroxypregnan-20-one (Preparation 20) is converted to 4-chloro-21-bromo-17α-hydroxypregnane-3,11,20-trione in essentially a quantitative yield; melting point 168 to 174 degrees centigrade. In the same manner 21-bromo-3β,11β,17α-trihydroxypregnan-20-one (Preparation 22) yields 4-chloro-21-bromo-17α-hydroxypregnane-3,11,20-trione identical with the product of Example 6, and which may be converted to cortisone acetate as shown in Example 6.

Example 14.—4-chloro-21-bromo-11α-acetoxy-17α-hydroxypregnane-3,20-dione

21 - bromo - 11α-acetoxy-3α,17α-dihydroxypregnan-20-one is treated with tertiary-butyl hypochlorite according to the method of Example 3 to obtain 4-chloro-21-bromo-11α-acetoxy-17α-hydroxypregnane-3,20-dione. Use of the starting compound 21-bromo-11α-acetoxy-3β,17α-dihydroxypregnan-20-one also gives 4-chloro-21-bromo-11α-acetoxy-17α-hydroxypregnane-3,20-dione in high yield.

In the same manner other 4-chloro-21-bromo-11α-acyloxy - 17α - hydroxypregnane-3,20-diones are prepared from the corresponding 21-bromo-11α-acyloxy-3α(or β),-17α - dihydroxypregnan - 20-ones, including 4-chloro-21-bromo - 11α-formyloxy-17α-hydroxypregnane-3,20-dione; 4 - chloro - 21 - bromo-11α-propionoxy-17α-hydroxypregnane-3,20-dione; 4-chloro-21-bromo-11α-butryloxy-17α-hydroxypregnane-3,20-dione; 4 - chloro-21-bromo-11α-valeryloxy-17α-hydroxypregnane-3,20-dione; 4-chloro-21-bromo - 11α - hexanoyloxy - 17α-hydroxypregnane-3,20-dione; 4 - chloro - 21 - bromo-11α-heptanoyloxy-17α-hydroxypregnane-3,20-dione; 4-chloro-21-bromo-11α-octanoyloxy-17α-hydroxypregnane-3,20-dione; and the like.

4 - chloro-21-bromo-11α-acyloxy-17α-hydroxypregnane-3,20-diones may be converted to cortisone acetate as shown in Example 11.

Example 15.—4,21-dichloro-11α,17α-dihydroxypregnane-3,20-dione 21-chloro-3α,11α,17α-trihydroxypregnan-20-one (Preparation 25) is converted, according to the method of Example 1, to 4,21-dichloro-11α,17α-dihydroxypregnane-3,20-dione, the weight of steroid product being about the same as the weight of starting steroid.

In the same manner other 4,21-dichloro-1-oxygenated-17α-hydroxypregnane-3,20-diones are prepared from corresponding 21-chloro - 11 - oxygenated 3,17α-dihydroxypregnan-20-ones, including 4,21-dichloro-11α-formyloxy-17α - hydroxypregnane-3,20-dione; 4,21-dichloro-11α-propionoxy-17α-hydroxypregnane-3,20-dione; 4,21 - dichloro-11α-butryloxy-17α-hydroxypregnane - 3,20 - dione; 4,21-dichloro-11α-valeryloxy-17α-hydroxypregnane-3,20-dione; 4,21-dichloro-11α-hexanoyloxy - 17α - hydroxypregnane-3,20-dione; 4,21-dichloro-11α-heptanoyloxy-17α-hydroxypregnane-3,20-dione; 4,21-dichloro-11α-octanoyloxy-17α-hydroxypregnane-3,20-dione; and the like.

The 21-chloro derivative may be converted to cortisone acetate in the same manner as the 21-bromo derivatives of Example 12 through Example 14.

Example 16.—4-chloro - 21 - acetoxy-11α,17α-dihyroxypregnane-3,20-dione

Using the method of Example 1, 21-acetoxy-3α,11α,17α-trihydroxypregnan-20-one (Preparation 26) gives almost the theoretical weight of 4-chloro-21-acetoxy-11α,17α-dihydroxypregnane-3,20-dione. In the same manner 21-acetoxy - 3β,11α,17α-trihydroxypregnan-20-one (Preparation 28) is converted to 4-chloro-21-acetoxy-11α,17α-dihydroxypregnane-3,20-dione.

Other 4-chloro-21-acyloxy-11α,17α-dihydroxypregnane-3,20-diones are prepared from the appropriate 21-acyloxy-3α(or β), 11α,17α-trihydroxypregnan-20-ones in the same manner, including 4-chloro-21-formyloxy-11α,17α-dihydroxypregnane-3,20-dione; 4 - chloro-21-propionoxy-11α,-17α - dihydroxypregnane-3,20-dione; 4-chloro-21-butryloxy-11α,17α-dihydroxypregnane-3,20-dione; 4-chloro-21-valeryloxy - 11α,17α - dihydroxypregnane-3,20-dione; 4-chloro-21-hexanoyloxy-11α,17α-dihydroxypregnane - 3,20-dione; 4-chloro-21-heptanoyloxy-11α,17α - dihydroxypregnane-3,20-dione; 4 - chloro-21-octanoyloxy-11α,17α-dihydroxypregnane-3,20-dione; and the like.

4-chloro-21-acyloxy-11α,17α-dihydroxypregnane - 3,20-diones are oxidized with chromic acid in acetic acid under mild conditions to obtain 4-chloro-21-acyloxy-17α-hydroxypregnane-3,11,20-triones which are convertible to cortisone acylates as shown in Example 3 for cortisone acetate preparation.

Example 17.—4-chloro-21-acetoxy-17α-hydroxypregnane-3,11,20-trione 21-acetoxy-3α,11β,17α-trihydroxypregnan-20-one (Preparation 27) is treated with about 4.2 molar equivalents of tertiary-butyl hypochlorite according to the method of Example 9 to give nearly the theoretical quantity of 4-chloro-21-acetoxy-17α-hydroxypregnane - 3,11,20 - trione; melting point 233–237 degrees centigrade. The same product is obtained in the same manner starting with 21-acetoxy-3β,11β,17α-trihydroxypregnan-20-one.

In the same manner other 4-chloro-21-acyloxy-17α-hydroxypregnane-3,11,20-triones are prepared from corresponding 21-acyloxy-3α(or β),11β,17α-trihydroxypregnan-20-ones, including 4-chloro-21-formyloxy-17α-hydroxypregnane-3,11,20-triones; 4-chloro-21-propionoxy-17α-hydroxypregnane-3,11,20-triones; 4-chloro - 21 - butyryloxy-17α-hydroxypregnane-3,11,20-triones; 4-chloro-21-valeryloxy-17α-hydroxypregnane-3,11,20-triones; 4 - chloro - 21 - hexanoyloxy - 17α - hydroxypregnane-3,11,20-triones; 4-chloro - 21 - heptanoyloxy-17α-hydroxypregnane-3,11,20-triones; 4 - chloro-21-octanoyloxy-17α-hydroxypregnane-3,11,20-triones; and the like.

4-chloro-21-acyloxy - 17α - hydroxypregnane - 3,11,20-triones are convertible to cortisone acylates as shown in Example 3 for cortisone acetate preparation.

*Example 18.—4-chloro-11α,21 - diacetoxy - 17α-hydroxypregnane-3,20-dione*

Treating 11α,21-diacetoxy-3α,17α-dihydroxypregnan-20-one (Preparation 30) with tertiary butyl hypochlorite according to the procedure of Example 1 gives high yields of 4-chloro-11α,21-diacetoxy-17α-hydroxypregnane - 3,20-dione. In the same manner 11α,21-diacetoxy-3β,17α-dihydroxypregnan-20-one (Preparation 31) is converted to 4-chloro-11α,21-diacetoxy - 17α - hydroxypregnane-3,20-dione in comparable yield.

Other 4-chloro-11α,21-diacyloxy-17α-hydroxypregnane-3,20-diones are prepared from 11α,21-diacyloxy-3α(or β),17α-dihydroxy-pregnan-20-ones in the same manner, including 4-chloro-11α - acetoxy - 21 - formyloxy-17α-hydroxypregnane-3,20-dione; 4 - chloro-11α-acetoxy-21-propionoxy-17α-hydroxypregnane-3,20-dione; 4 - chloro-11α-acetoxy-21-butyryloxy-17α-hydroxypregnane-3,20 - dione; 4-chloro-11α-acetoxy-21-valeryloxy-17α-hydroxypregnane-3,20-dione; 4-chloro-11α-acetoxy-21-hexanoyloxy-17α-hydroxypregnane-3,20-dione; 4 - chloro-11α-acetoxy-21-heptanoyloxy-17α-hydroxypregnane-3,20-dione; 4-chloro-11α-acetoxy-21-octanoyloxy-17α-hydroxypregnane-3,20-dione; 4 - chloro-11α,21-diformyloxy-17α-hydroxypregnane-3,20-dione; 4-chloro-11α,21-dipropionoxy - 17α - hydroxypregnane-3,20-dione; 4-chloro-11α,21-dibutyryloxy - 17α - hydroxypregnane-3,20-dione; 4-chloro - 11α,21 - dihexanoyloxy-17α-hydroxypregnane-3,20-dione; 4-chloro-11α,21-dioctanoyloxy-17α-hydroxypregnane-3,20-dione; 4 - chloro-11α - propionoxy-21-acetoxy-17α-hydroxypregnane - 3,20-dione; and the like.

Treatment of 4-chloro-11α,21-diacyloxy-17α-hydroxypregnane-3,20-diones with semicarbazide hydrochloride followed by pyruvic acid gives 11α,21-diacyloxy-17α-hydroxy-4-pregnene-3,20-diones. Saponification of these diacyloxypregnenes with sodium hydroxide in aqueous alcohol gives 11α,17α,21-trihydroxy-4-pregnene-3,20-dione which may be converted to cortisone acetate as shown in Example 11.

*Example 19.—4-chloropregnane-3,20-dione*

One gram of 3α-hydroxypregnan-20-one dissolved in fifty milliliters of tertiary-butyl alcohol containing 1.5 milliliters of water and 0.4 milliliter of concentrated hydrochloric acid is admixed with 0.85 gram of tertiary-butyl hypochlorite, and the resulting mixture is allowed to stand at room temperature with occasional shaking. After about two hours the product begins to precipitate and is recovered by filtration; weight 0.4 gram; melting point 178–183 degrees centigrade. An additional 0.5 gram of 4-chloropregnane-3,20-dione is recovered from the filtrate by evaporating the solution to dryness.

In the same manner as described in Example 1 through Example 19, other 3-hydroxysteroids are converted to 4-chloro-3-ketosteroids using tertiary-butyl, tertiary-amyl, or other organic hypochlorite such as, for example, propyl hypochlorite, hexyl hypochlorite, octyl hypochlorite, or the like. Steroids thus-produced, which may be dehydrohalogenated as shown in the above examples to give Δ⁴-3-ketosteroids, include the following: coprostanol or epicoprostanol gives 4-chlorocoprostanone which on dehydrohalogenation gives the known Δ⁴-cholestenone; 3α(or β)-hydroxy-21-acetoxypregnane-11,20-dione or 3α-(or β),11β-dihydroxy-21-acetoxypregnan-20-one gives 4-chloro-21-acetoxypregnane-3,11,20-trione which on dehydrohalogenation yields the known 21-acetoxy-4-pregnene-3,11,20-trione; 3α(or β)-hydroxy-17-isoetiocholanic acid gives 4-chloro-3-keto-17-isoetiocholanic acid which on dehydrohalogenation yields the known 3-keto-17-iso-Δ⁴-etiocholenic acid; 3α(or β)-hydroxypregnane-11,20-dione gives 4-chloropregnane-3,11,20-trione which on dehydrohalogenation yields the known 4-pregnene-3,11,20-trione; 3α(or β),11β-dihydroxypregnan-20-one also gives 4-chloropregnane-3,11,20-trione; and other like examples.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process which comprises: contacting a saturated 3-hydroxysteroid with an organic hypochlorite in the presence of water.

2. A process which comprises: contacting a saturated 3-hydroxysteroid with an alkyl hypochlorite in the presence of water.

3. A process for the conversion of a 3-secondary-hydroxysteroid to a 4-chloro-3-ketosteroid by simultaneous oxidation and chlorination which comprises: contacting a saturated 3-secondary-hydroxysteroid which is unsubstituted at the 4-position and which has the normal stereoconfiguration at the 5-carbon atom with an alkyl hypochlorite containing more than one carbon atom, in the presence of an organic solvent, and in the presence of water in amount up to about twenty percent of the reaction mixture by weight, at a temperature between about minus ten and about plus fifty degrees centigrade, to produce a 4-chloro-3-ketosteroid.

4. A process for the conversion of a 3-secondary-hydroxysteroid to a 4-chloro-3-ketosteroid by simultaneous oxidation and chlorination which comprises: contacting a saturated 3,11α-disecondary-hydroxysteroid containing no primary or other secondary-hydroxy groups and which is unsubstituted at the 4-position and has the normal configuration at the 5-carbon atom with an alkyl hypochlorite containing more than one carbon atom, in the presence of an organic solvent, and in the presence of water in amount up to about twenty percent of the reaction mixture by weight, at a temperature between about minus ten and about plus fifty degrees centigrade, to produce a 4-chloro-3-keto,11α-hydroxysteroid.

5. A process for the conversion of a 3-secondary-hydroxysteroid to a 4-chloro-3-ketosteroid by simultaneous oxidation and chlorination which comprises: contacting a saturated 3,11β-disecondary-hydroxysteroid containing no primary or other secondary-hydroxy groups and which is unsubstituted at the 4-position and has the normal configuration at the 5-carbon atom with an alkyl hypochlorite containing more than one carbon atom, in the presence of an organic solvent, and in the presence of water in amount up to about twenty percent of the reaction mixture by weight, at a temperature between about minus ten and about plus fifty degrees centigrade, to produce a 4-chloro-3,11-diketosteroid.

6. A process for the conversion of a 3-secondary-hydroxysteroid to a 4-chloro-3-ketosteroid by simultaneous oxidation and chlorination which comprises: contacting a saturated 11-keto-3-secondary-hydroxysteroid containing no primary or other secondary-hydroxy groups and which is unsubstituted at the 4-position and has the normal configuration at the 5-carbon atom with an alkyl hypochlorite containing more than one carbon atom, in the presence of an organic solvent, and in the presence of water in amount up to about twenty per cent of the reaction mixture by weight, at a temperature between about minus ten and about plus fifty degrees centigrade, to produce a 4-chloro-3,11-diketosteroid.

7. A process for the conversion of a 3-secondary-hydroxysteroid to a 4-chloro-3-ketosteroid by simultaneous oxidation and chlorination which comprises: contacting a saturated 11-keto-3-secondary-hydroxysteroid containing no primary or other secondary-hydroxy groups and which is unsubstituted at the 4-position and has the normal configuration at the 5-carbon atom, with at least about two molar equivalents of tertiary-butyl hypochlorite, in the presence of an organic solvent and an acid, and in the presence of water in amount up to about twenty percent of the reaction mixture by weight, at a temperature between about twenty and about thirty degrees centigrade, to produce a 4-chloro-3,11-diketosteroid.

8. A process for the conversion of a 3-secondary-hydroxysteroid to a 4-chloro-3-ketosteroid by simultaneous oxidation and chlorination which comprises: contacting a saturated 3,11α-disecondary-hydroxysteroid containing no primary or other secondary-hydroxy groups and which is unsubstituted at the 4-position and has the normal configuration at the 5-carbon atom, with at least about two molar equivalents of tertiary-butyl hypochlorite, in the presence of an organic solvent and an acid, and in the presence of water in amount up to about twenty percent of the reaction mixture by weight, at a temperature between about twenty and about thirty degrees centigrade, to produce a 4-chloro-3-keto-11α-hydroxysteroid.

9. A process for the conversion of a 3-secondary-hydroxysteroid to a 4-chloro-3-ketosteroid by simultaneous oxidation and chlorination which comprises: contacting a saturated 3,11β-disecondary-hydroxysteroid containing no primary or other secondary-hydroxy groups and which is unsubstituted at the 4-position and has the normal configuration at the 5-carbon atom, with at least about four molar equivalents of tertiary-butyl hypochlorite, in the presence of an organic solvent and an acid, and in the presence of water in amount up to about twenty percent of the reaction mixture by weight, at a temperature between about twenty and about thirty degrees centigrade, to produce a 4-chloro-3,11-diketosteroid.

10. A process for the conversion of a 3-secondary-hydroxysteroid to a 4-chloro-3-ketosteroid by simultaneous oxidation and chlorination which comprises: contacting 3,17α-dihydroxypregnane-11,20-dione with between about 2.2 and about 2.5 molar equivalents of tertiary-butyl hypochlorite, in the presence of tertiary-butyl alcohol and between about 0.5 and about 1.5 molar equivalents of hydrogen chloride, and in the presence of water in amount up to about twenty percent of the reaction mixture by weight, at a temperature between about twenty and about thirty degrees centigrade, to produce 4-chloro-17α-hydroxypregnane-3,11,20-trione.

11. A process for the conversion of a 3-secondary-hydroxysteroid to a 4-chloro-3-ketosteroid by simultaneous oxidation and chlorination which comprises: contacting 3,17α-dihydroxy-21-bromopregnane-11,20-dione with between about 2.2 and about 2.5 molar equivalents of tertiary-butyl hypochlorite, in the presence of tertiary-butyl alcohol and between about 0.5 and about 1.5 molar equivalents of hydrogen chloride, and in the presence of water in amount up to about twenty percent of the reaction mixture by weight, at a temperature between about twenty and about thirty degrees centigrade, to produce 4-chloro-17α-hydroxy-21-bromopregnane-3,11,20-trione.

12. A process for the conversion of a 3-secondary-hydroxysteroid to a 4-chloro-3-ketosteroid by simultaneous oxidation and chlorination which comprises: contacting a 3,17α-dihydroxy-21-acyloxypregnane-11,20-dione with between about 2.2 and about 2.5 molar equivalents of tertiary-butyl hypochlorite, in the presence of tertiary-butyl alcohol and between about 0.5 and about 1.5 molar equivalents of hydrogen chloride, and in the presence of water in amount up to about twenty percent of the reaction mixture by weight, at a temperature between about twenty and about thirty degrees centigrade, to produce a 4-chloro-17α-hydroxy-21-acyloxypregnane-3,11,20-trione.

13. A process for the conversion of a 3-secondary-hydroxysteroid to a 4-chloro-3-ketosteroid by simultaneous oxidation and chlorination which comprises: contacting a 3,11α,17α-trihydroxy-21-acyloxypregnan-20-one with between about 2.2 and about 2.5 molar equivalents of tertiary-butyl hypochlorite, in the presence of tertiary-butyl alcohol and between about 0.5 and about 1.5 molar equivalents of hydrogen chloride, and in the presence of water in amount up to about twenty percent of the reaction mixture by weight, at a temperature between about twenty and about thirty degrees centigrade, to produce a 4-chloro-11α,17α-dihydroxy-21-acyloxyprepnane-3,20-dione.

14. A process for the conversion of a 3-secondary-hydroxysteroid to a 4-chloro-3-ketosteroid by simultaneous oxidation and chlorination which comprises: contacting a 3,11β,17α-trihydroxy-21-acyloxypregnan-20-one with between about 4.2 and about 4.5 molar equivalents of tertiary-butyl hypochlorite, in the presence of tertiary-butyl alcohol and between about 0.5 and about 1.5 molar equivalents of hydrogen chloride, and in the presence of water in amount up to about twenty percent of the reaction mixture by weight, at a temperature between about twenty and about thirty degrees centigrade, to produce a 4-chloro-17α-hydroxy-21-acyloxypregnane-3,11,20-trione.

15. A process for the conversion of a 3-secondary-hydroxysteroid to a 4-chloro-3-ketosteroid by simultaneous oxidation and chlorination which comprises: contacting a steroid of the following formula:

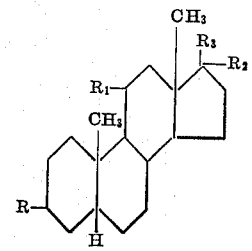

wherein R is selected from the group consisting of α-hydroxy and β-hydroxy; $R_1$ is selected from the group consisting of hydrogen α-hydroxy, α-acyloxy, β-hydroxy, and ketonic oxygen; $R_2$ is selected from the group consisting of hydrogen and hydroxy; and $R_3$ is selected from the group consisting of acetyl, bromoacetyl, chloroacetyl, and acyloxyacetyl; with at least about two molar equivalents of a tertiary-alkyl hypochlorite, in the presence of an organic solvent, and in the presence of water in amount up to about twenty percent of the reaction mixture by weight, at a temperature between about minus ten and about plus fifty degrees centigrade, to produce a 4-chloro-3-ketosteroid.

References Cited in the file of this patent

UNITED STATES PATENTS

| | | |
|---|---|---|
| 2,403,683 | Reichstein | July 9, 1946 |
| 2,541,104 | Sarett | Feb. 13, 1951 |